United States Patent [19]
Dessus et al.

[11] 3,790,899
[45] Feb. 5, 1974

[54] DISCHARGE TUBE

[75] Inventors: Benjamin Dessus, Paris; Jacques Migné, Bretigny-sur-Orge; Jean-Michel Catherin, Sav Igny-sur-Orge, all of France

[73] Assignee: Compagnie Generale D'Electricite, Paris, France

[22] Filed: Oct. 12, 1971

[21] Appl. No.: 188,060

[30] Foreign Application Priority Data
Oct. 9, 1970 France .............................. 7036591

[52] U.S. Cl. .................. 331/94.5, 330/4.3, 313/207
[51] Int. Cl. ........................... H01s 3/22, H01s 3/02
[58] Field of Search ...... 331/94.5; 330/4.3; 313/207

[56] References Cited
UNITED STATES PATENTS
3,233,137  2/1966  Anderson et al. .................. 313/201
3,449,694  6/1969  Bell ................................... 331/94.5
3,464,025  8/1969  Bell ................................... 331/94.5

OTHER PUBLICATIONS
deMars et al., Rytheon Final Research Report, Aug. 1968, pp. 1, 27, 34–36 and 42–50. Report No. S–1078.
NASA–CR–86111 available from N.T.I.S., Sp. Fld., Va. Abstract in S.T.A.R. N68–37855.

Primary Examiner—John K. Corbin
Assistant Examiner—R. J. Webster
Attorney, Agent, or Firm—Sughrue, Rothwell, Mion, Zinn and Macpeak

[57] ABSTRACT

A discharge tube which includes two electrodes, one at each end of the tube, for producing a potential barrier to urge charged particles from the end of the tube towards the discharge region of the tube. The electrodes are separated from the interior of the tube by a dielectric layer.

1 Claim, 3 Drawing Figures

INVENTORS
BENJAMIN DESSUS
JACQUES MIGNE
JEAN-MICHEL CATHERIN
BY Sughrue, Rothwell, Mion, Zinn & Macpeak
ATTORNEYS

DISCHARGE TUBE

BACKGROUND OF THE INVENTION

1. Field of the Invention

The present invention relates to discharge tubes and more particularly but not exclusively to discharge tubes for gas lasers in which the gaseous medium is excited by an electric discharge.

2. Description of the Prior Art

A gas laser comprises a resonant cavity between two mirrors, at least one of which is semireflecting so as to allow the laser beam to leave the cavity; and a discharge tube placed in the resonant cavity, the discharge tube being filled with a gaseous mixture capable of producing stimulated emission when there is a discharge in the tube.

A laser discharge tube, owing to its operation in a laser, has a particular structure. It usually comprises a cylindrical body closed at its two ends by optical surfaces. These optical surfaces can be, in the case of an integrated structure, the mirrors of the resonant cavity. The tube also comprises two electrodes. These may be placed in the cylindrical body or, when the tube has a small diameter, in external bulbs which connect with the tube.

The mirrors of the resonant cavity comprise dielectric layers formed on a transparent support. When one of these mirrors is integral with the discharge tube, the dielectric layers are in contact with the gaseous medium in the interior of the tube. After operation of the laser, a deterioration in the condition of the dielectric layers occurs and thus a loss in the emission power of the laser. This can be reduced to zero.

Where the mirrors comprise alternate layers of silicon and titanium dioxide, the absorption coefficient of the mirror, and more particularly that of the first layer in contact with the gaseous medium, increase as the layer is used.

This phenomemon occurs with numerous dielectric layers of mirrors at the output of gas lasers.

SUMMARY OF THE INVENTION

According to the present invention there is provided a discharge tube having two first electrodes between which a gas discharge may be produced, and first means for producing a potential barrier to urge charged particles from a first end of the tube towards the discharge region.

BRIEF DESCRIPTION OF THE DRAWINGS

The present invention will be further described in more detail, by way of example only, with reference to the accompanying drawings.

DESCRIPTION OF THE PREFERRED EMBODIMENT

Figure 1:
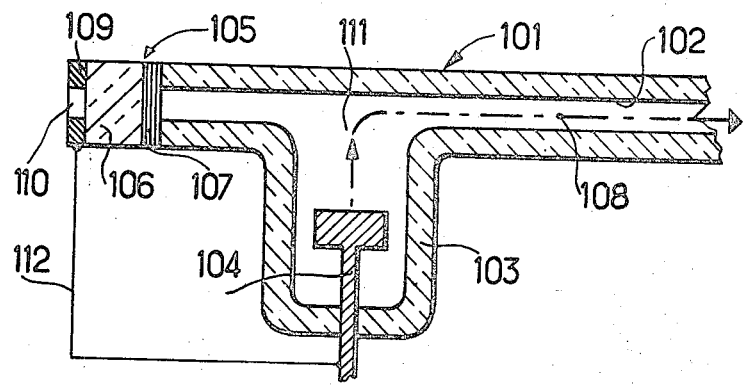
FIGS. 1 through 3 diagrammatically show parts of discharge tubes.

Referring to FIG. 1, a discharge tube 101 has a cylindrical cavity 102. A bulb 103, in which is mounted a principal electrode 104, opens into the caivty 102. The end of the cavity 102 is closed by a mirror 105 comprising a support 106 on which dielectric layers 107 are deposited. The dielectric layers face the interior of the cavity 102.

Only one end of the tube is shown but a further principal electrode is placed at the other end so that an electric discharge can be obtained between the two electrodes. The path 108 of the continous discharge is shown in the FIG. 1.

A counter-electrode 109 is placed on the support 106 of the mirror 105 and is electrically connected by a conductor 112 to the electrode 104. The counter-electrode is therefore at the same electric potential as the electrode 104.

When the discharge tube is used for a gas laser and the mirror 105 forms the exit mirror of the laser cavity, the counter-electrode 109 has an axial hole 110 so as to allow the laser beam to emerge from the cavity.

It is possible that the increase in the absorption coefficient of the dielectric layer which is in direct contact with the interior of the discharge tube is due to the bombardment of this layer by electrically charged particles. These particles are in the plasma created by the discharge.

In the case where the electrode 104 is the anode, it emits positive ions and a certain number of these arrive in the cavity 102 at the point 111 with enough energy to bombard the dielectric layer 107. When the counter-electrode 109, which is for example at the anode potential, is placed in position, a potential barrier is formed which urges positive particles towards the discharge region. They are then directed towards the cathode of the discharge tube. The counter-electrode 109 is protected from the interior of the discharge tube by the support of the dielectric layers which is itself a dielectric material. The discharge is therefore only produced between the electrodes in the discharge tube.

The discharge tube may also have a second counter-electrode (not shown) adjacent the other end of the discharge tube. This other end may also have a dielectric mirror identical to that shown in FIG. 1. This second electrode is held at a predetermined potential, for example that of the cathode, in the case where the electrode shown is the anode. In this case electrons striking the second mirror are urged towards the discharge region.

The discharge tube has a shape such that the distance between the anode and the part of the plasma nearest the mirror is less than the distance between the mirror and this part of the plasma. These two distances are the distances between the top of the electrode 104 and the point 111 and between the mirror 105 and the point 111. The counter-electrode in this case is held at the potential of the electrode 104 but can be held at the potential which is sufficient to urge the particles which may bombard the dielectric layer of the mirror towards the discharge region. This potential is difficult to determine as it depends on numerous parameters. It is preferably determined experimentally for each shape of discharge tube. The annular counter-electrode 109 protected by the mirror may be replaced by a ring placed directly around or in the cavity 102 of the discharge tube 101, preferably around or in the part of the cavity 101 adjacent the dielectric layers 107 in which a discharge is not produced.

Figure 2:
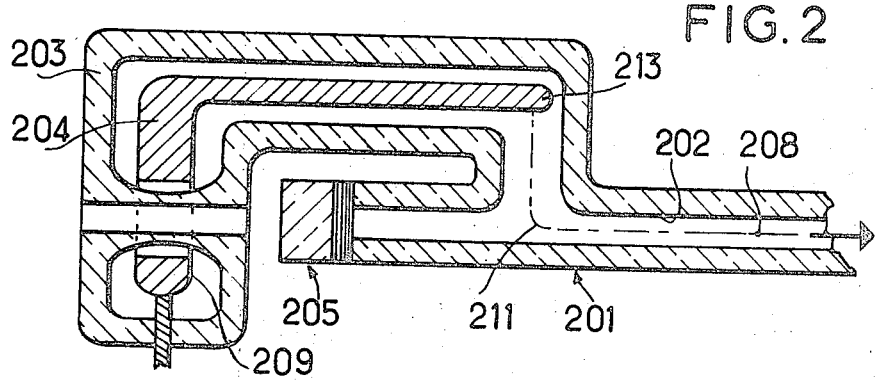

Referring to FIG. 2, a discharge tube 201 has a cavity 202 which communicates with a bulb 203. An electrode 204 is placed in the bulb 203. The end of the cavity 202 is closed by a dielectric layer mirror 205. The bulb 203 and the electrode 204 have a shape such that one part 209 of the electrode 204 is situated adjacent the mirror 205. Another part 213 of the electrode 204 is preferably close to the interior of the cavity 202. The distance between the point 211 of the discharge and the mirror 205 is preferably greater than the distance between this part 213 and the point 211 on the discharge path 208. With such a configuration, the part 209 of the electrode 204 protects the mirror 205 from particles emitted by this same electrode and its part 213 more easily attracts the majority of particles emitted by the second electrode (not shown) of the discharge tube.

FIGS. 1 and 2 show discharge tubes having a cavity and electrodes in bulbs which communicate with the interior of the cavity. However, discharge tubes can have, particularly in the case of lasers, electrodes which are placed directly in the cavity.

Figure 3:
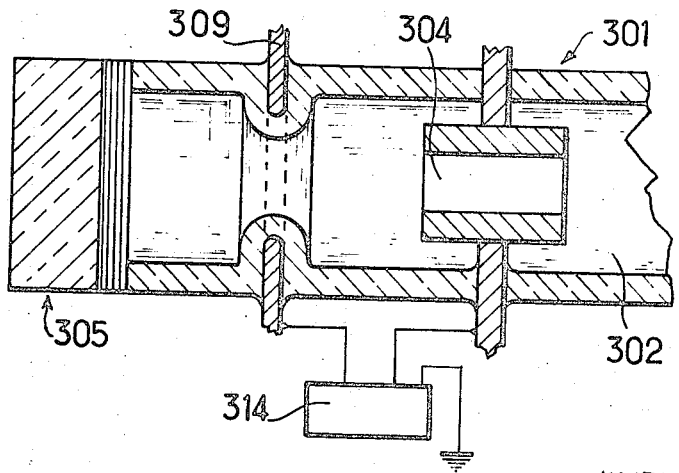

Referring to FIG. 3, the tube 301 has a cavity 302 in which an electrode 304 is placed. The electrode 304 is formed from a metallic portion having an axial hole whose axis lies along the axis of the cavity 302. The cavity 302 has at its end a multidielectric mirror 305.

It can happen that heated electrodes emit particles which possess enough energy to bombard the dielectric layers of the mirror 305.

In order to avoid this bombardment, a counter-electrode 309 is placed between the end of the discharge tube having the mirror 305 and the electrode 304. This counter-electrode 309 is protected from the interior of the cavity by a dielectric. This dielectric may be the wall of the cavity 302.

The counter-electrode 309 is held at a potential at least equal to that of the electrode 304 and preferably slightly higher. This potential can be obtained by connecting the counter-electrode 309 to the voltage source 314.

While the invention has been particularly shown and described with reference to the preferred embodiment thereof, it will be understood by those skilled in the art that various changes in form and details may be made therein without departing from the spirit and scope of the invention.

We claim:
1. A discharge laser comprising:
   a. a vessel at least a part of which forms a laser discharge tube and having first and second end walls perpendicular to the longitudinal axis of said discharge tube;
   b. first optical reflecting means on the inner side of said first end wall;
   c. second optical reflecting means near the said second end wall and defining with said first optical reflecting means an optical resonator;
   d. first and second principal electrode means disposed within said vessel, but spaced from said first and second end walls respectively; said first and second principal electrode means forming between them a discharge path within a center portion of said discharge tube, at least a portion of said discharge path extending along said longitudinal axis of said discharge tube;
   e. means for applying a D.C. potential between said first and second principal electrode means to form a discharge along said path;
   f. counter electrode means disposed near said first end wall, but outside said discharge path;
   g. means for applying a D.C. potential to said counter electrode means for creating an electric field of a polarity to repel electrically charged particles of said discharge from said first end wall toward said discharge path; and
   h. said vessel comprising a bulb extending externally from the lateral wall of said discharge tube and communicating with said discharge path, said bulb housing an electrode having: a first portion adjacent said discharge path and comprising said first principal electrode means; and a second portion comprising said counter electrode means, said second portion being located externally of said discharge tube and adjacent said first end wall.

* * * * *